United States Patent [19]

Zurek et al.

[11] Patent Number: 5,537,870
[45] Date of Patent: Jul. 23, 1996

[54] CONTAMINANT FREE BACKFLOW REDUCING INSERT FOR MASS AIR FLOW SENSORS

[75] Inventors: Lawrence A. Zurek, Harrison Township; Lorna J. Clowater, Canton, both of Mich.

[73] Assignee: Ford Motor Company, Dearborn, Mich.

[21] Appl. No.: 316,990

[22] Filed: Oct. 3, 1994

[51] Int. Cl.⁶ ................................ G01F 1/68; G01F 5/00
[52] U.S. Cl. ................ 73/202; 73/204.22; 73/118.2
[58] Field of Search .................... 73/202, 202.5, 73/204.22, 118.2

[56] References Cited

U.S. PATENT DOCUMENTS

| | | | |
|---|---|---|---|
| 3,352,154 | 11/1967 | Djorup | 73/204.15 |
| 4,215,565 | 8/1980 | Zanker | 73/202 |
| 4,434,656 | 3/1984 | Blechinger | 73/204.21 |
| 4,457,169 | 7/1984 | Lauterbach et al. | 73/202.5 |
| 4,478,075 | 10/1984 | Oyama et al. | 73/118.2 |
| 4,495,802 | 1/1985 | Kashiwaya et al. | 73/118.2 |
| 4,571,996 | 2/1986 | Wakeman et al. | 73/202.5 |
| 4,709,581 | 12/1987 | Nishimura et al. | 73/202 |
| 4,856,328 | 8/1989 | Johnson | 73/202 |
| 4,974,445 | 12/1990 | Arai et al. | 73/118.2 |
| 4,991,560 | 2/1991 | Arai et al. | 73/118.2 |
| 5,383,356 | 1/1995 | Zurak et al. | 73/118.2 |

FOREIGN PATENT DOCUMENTS

0369592A2  of 0000  Germany.

Primary Examiner—Richard Chilcot
Assistant Examiner—Harshad Patel
Attorney, Agent, or Firm—Peter Abolins; Roger L. May

[57] ABSTRACT

A housing structure for mass air flow sensors includes an auxiliary passage way, internal to the structure, that diverts a portion of the main air flow towards sensing elements. The sensing elements are shielded from the main air flow, so the contaminants separate from the diverted air at the point of diversion and continue downstream in the main air flow. The decontaminated, diverted air passes over the sensing elements and out of the housing structure through two exit openings located in the rear of the structure. The housing structure, by locating the sensing elements within itself, away from the main air flow, and locating exit openings for the diverted air behind a blocking wall, is also able to eliminate the effect of backflow air over the mass air flow sensing elements.

10 Claims, 2 Drawing Sheets

CONTAMINANT FREE BACKFLOW REDUCING INSERT FOR MASS AIR FLOW SENSORS

BACKGROUND OF THE INVENTION

1. Field of the Invention

This invention relates to the field of mass air flow sensors and, in particular, to a housing unit for such a sensor.

2. Prior Art

There exists a condition in many internal combustion engines, when the air intake valve is open during the initial part of a compression stroke or prior to the completion of an exhaust stroke, which produces a momentary backflow of air through the engine's air intake manifold and mass airflow sensor.

There are known thermal mass air flow sensors such as taught in U.S. Pat. No. 4,974,455, which are not capable of distinguishing between normal air intake flow and backflow. Further, these sensors do not address the issue of particulate contamination on the mass air flow sensor element itself. Backflow within the intake manifold will result in an erroneous mass air flow signal which in turn will result in an incorrect response by the engine control systems dependent upon the signals. Particulate contamination of the air flow sensor results in readings that are not representative of the actual conditions. This is a result of the accumulation of particulates which reduce and obstruct the air flow passing by the sensing element.

Thermal mass air flow sensors of the type taught in U.S. Pat. No. 4,215,565, U.S. Pat. No. 3,352,154, and U.S. Pat. No. 4,434,656 acknowledge the issue of particulate contamination. The first two aforementioned patents, while acknowledging the issue of contamination, do not demonstrate a device which may effectively prevent it. U.S. Pat. No. 4,434,656 teaches a sensor system whereby the sensor is located along side a bluff body significantly larger than the diameter of the sensor wire such that the wire is neither in the stagnation zone where the particles are trapped or in the turbulent zone where faulty readings will occur due to turbulence. This device although adequately addressing the issue of particulate contamination, does not resolve the issue of faulty readings due to backflow over the sensing element.

Thermal mass air flow sensor taught in U.S. patent application Ser. No. 08/043,719, filed on Apr. 4, 1993, on behalf of inventors L. A. Zurek and L. J. Clowater, addresses the issue of backflow within the air intake system. The device includes a main air passage which leads to the engine, and an auxiliary passage which runs parallel to the main passage and leads into a recovery chamber, which subsequently is joined with the main air passage further downstream. Results for this device indicate significant improvement with respect to backflow induced faulty readings. However, this device does not accommodate the requirement of a contaminant-free sensor. These are some of the problems this invention overcomes.

SUMMARY OF THE INVENTION

The invention includes a housing for the mass air flow sensor which will reduce the contamination of the sensing element due to air-born particles and vapors and also will eliminate the effect of backflow on mass air flow readings. The housing has a structure that is fastened at the base to the exterior of the air flow passage housing. The body of the housing extends through a fitted opening in the wall of the air flow passage into the air flow passage itself, transverse to the flow along a longitudinal axis of the air flow passage. The exterior shape of the body of the housing is such that there is high pressure at the upstream surface, the side surfaces, and the bottom surface.

The backside, which constitutes the downstream portion of the housing body, has a surface with a plane which is, during forward flow, perpendicular to the flow of the air within the air passage which results in turbulence and low pressure. At the upstream side of the bottom surface there exists an opening to an internal auxiliary passage that extends in a direction perpendicular to the flow of the air. At the end of the auxiliary passage, the sensing element is situated, along with a venturi that directs the air over the sensing element and through an opening which leads to an exit chamber. The exit chamber has two exits, one at the downstream side of the bottom of the housing and the other located on the backside of the housing body, near the bottom surface.

The advantage of such a housing structure is that it allows a portion of the air flowing around the structure to be redirected into the auxiliary passage while heavier particles and vapor continue downstream, thereby effectively providing a clean air sample for the sensing element. In the condition where there exists backflow, the housing structure acts as a shield against the majority of the backflow air while the opening on the back side of the housing bleeds most of the air to the opening adjacent to it on the bottom side, thereby eliminating the effect of backflow on the sensing element. This device has the added benefit over prior art in that there is no maintenance involved with regards to cleaning the sensing elements or housing structure. This is by virtue of the fact that the contaminants do not accumulate on the housing structure itself but continue downstream with the main air flow.

DETAILED DESCRIPTION OF THE PREFERRED EMBODIMENT

Figure 1:
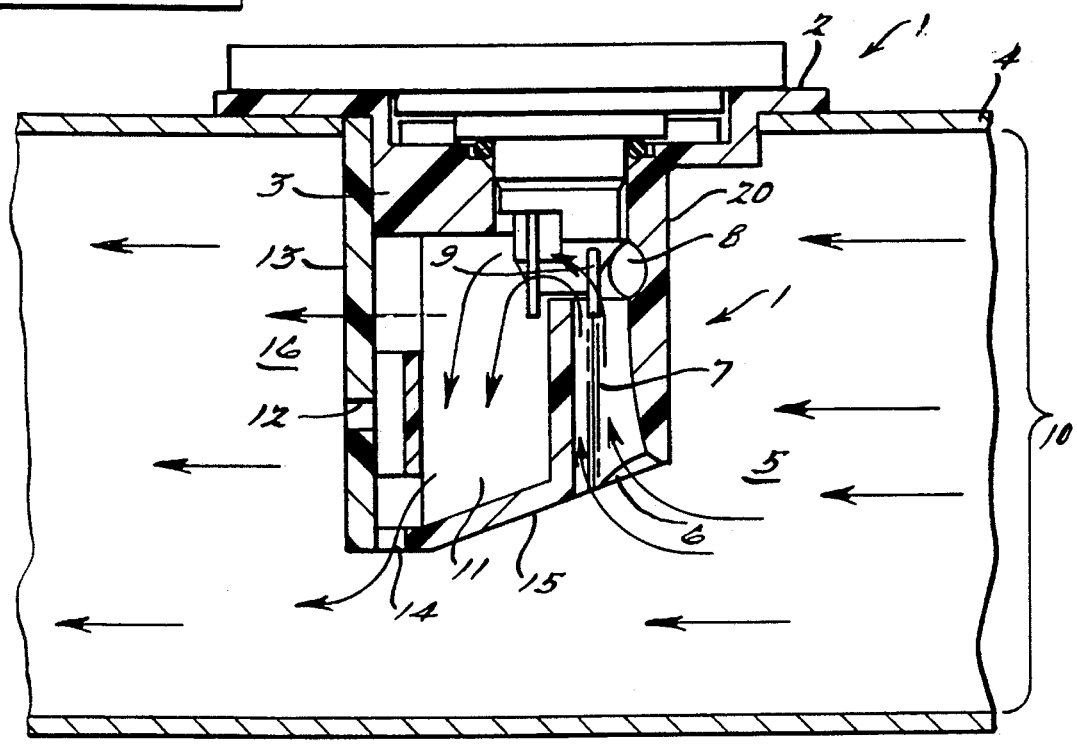
FIG. 1 is a side view of the housing showing forward direction air flow in and around the housing in accordance with an embodiment of this invention.

FIG. 1 shows a side view of a sensor housing structure in accordance with the preferred embodiment of this invention for providing contaminant free air flow for sampling and significant resistance to the effect of back flow. The arrows indicating air flow are for the condition of flow in the forward direction. A housing structure 1 has a base 2 and a body 3. Base 2 is fastened to an exterior surface of a wall 4 of an air flow passage such that body 3 extends into the interior of an air flow passage 10. Air flowing in the forward direction creates a high pressure area 5 on the front side and bottom surfaces of body 3. A perpendicular component 20 of housing structure 1 is positioned perpendicular the air flow so that it receives first contact with such air flow.

A portion of the air is diverted through an opening 6 into an auxiliary passage 7, while heavier contaminants by-pass opening 6 and continue downstream. The air within auxiliary passage 7 continues upward in body 3 until it is redirected by a venturi 8 over mass air flow sensing elements 9, which are positioned at the end of auxiliary passage 7, through an opening on base 2 of the preferred embodiment. The air then passes to a recovery chamber 11 and then exits recovery chamber 11 through an opening 12 on a back wall 13 of body 3 and also through an opening 14 on a bottom surface 15 of body 3 to a low pressure area 16 downstream. Because a portion of the total air flows within auxiliary passage 7, calibration of sensing elements 9 will be required such that the data taken from the sampled air may be extrapolated to account for the total mass air flow within the air flow passage.

Figure 2:
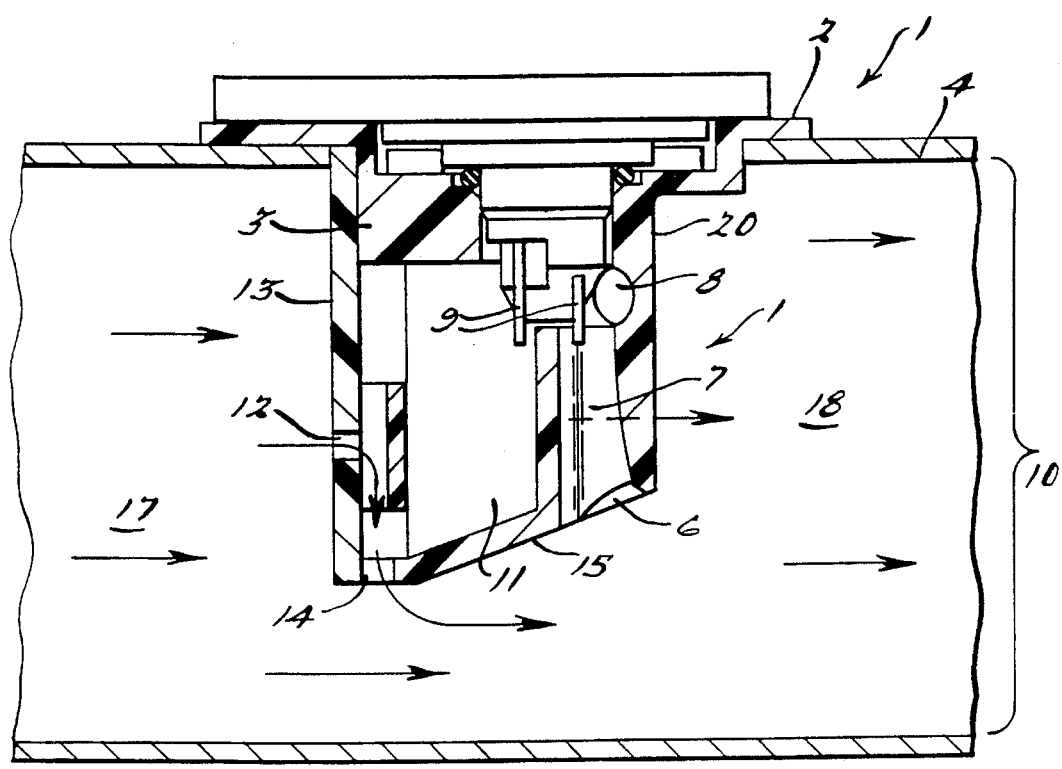
FIG. 2 is a side view of the housing showing air backflow in and around the housing in accordance with an embodiment of this invention.

FIG. 2 shows a side view as in FIG. 1 except the arrows show air flow in the reverse direction, or backflow. During backflow, air from a high pressure area 17 flows around a body 3 of the housing while a portion of the air enters an opening 12 in a back wall 13 of body 3. The air entering opening 12 exits through an opening 14 on a bottom surface 15 of body 3 where it continues downstream through a low pressure area 18.

Figure 3:
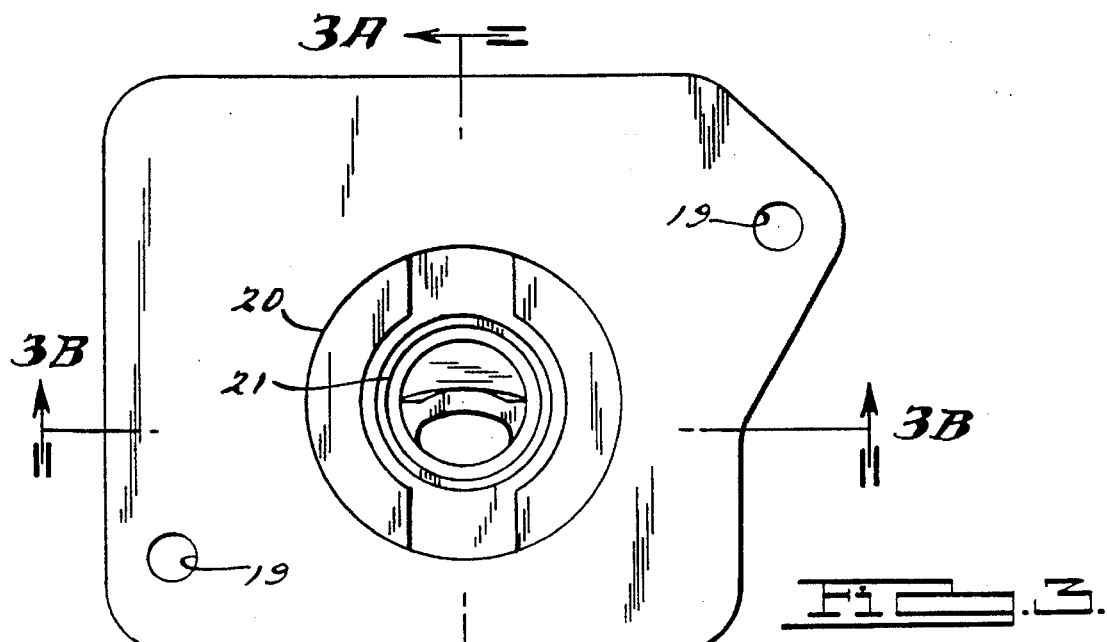
FIG. 3 is a top view of a housing in accordance with an embodiment of this invention.
Figure 3B:
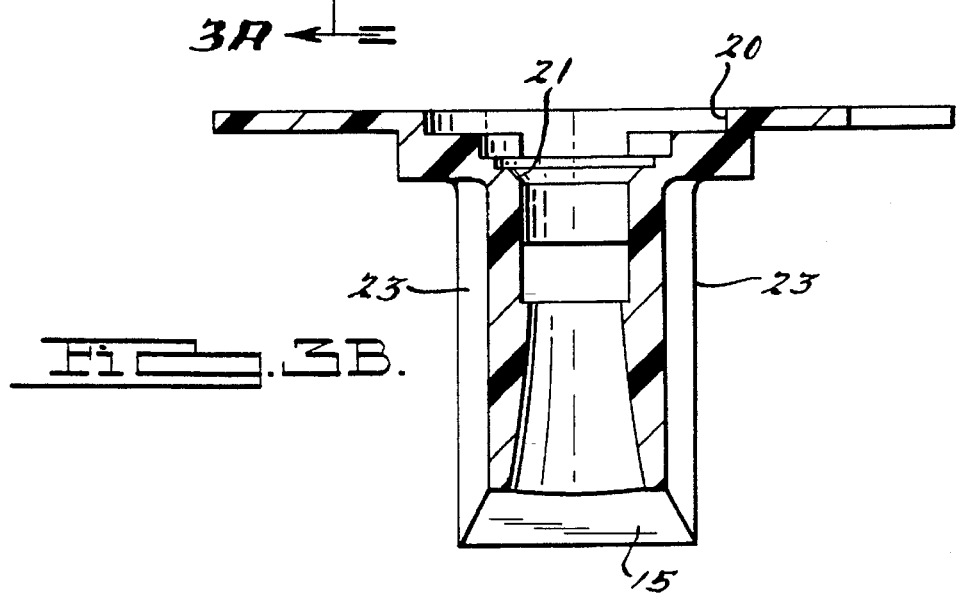
FIG. 3B is a section view along cross section B—B of FIG. 3.
Figure 3A:
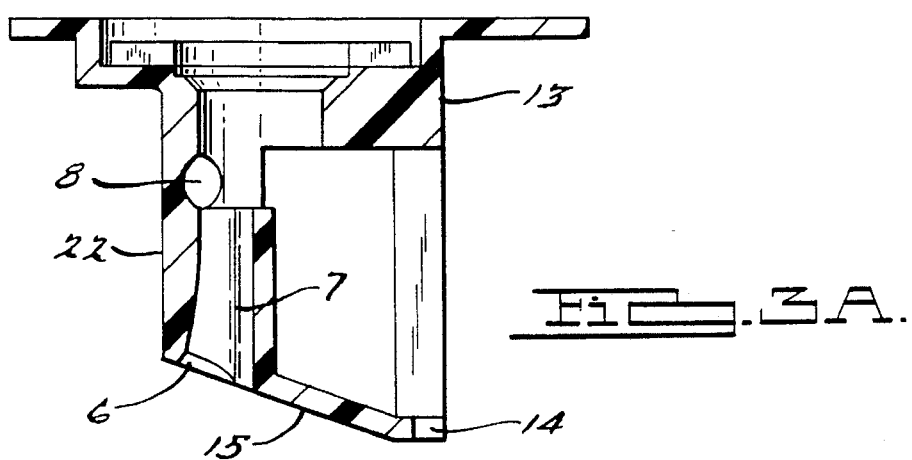
FIG. 3A is a section view along cross section A—A of FIG. 3.

FIGS. 3, 3A, and 3B are top and cross section views of the preferred embodiment. By way of example, base 2 is 55 mm×73 mm, has two holes 19 of diameter 4.5 mm located at diagonally opposite corners, and has a flush opening 20 in the center of the base of a diameter of 31 mm which leads to a smaller opening 21 of diameter 11 mm at the top of body 3. A front surface 22 is described as a semicircular plane of height 28 mm, radius 10 mm, and arc 175 degrees. Sides 23 of body 3 consist of two non-parallel planes that extend from the breaklines on the front plane. They extend towards the back of body 3 a distance 15 mm at which point there exist breaklines. From these breaklines, planes with height 35 mm extend in parallel 5 mm towards the back of body 3, thereby completing the sides. Back wall 13 of body 3 is 35 mm high and 24 mm wide. It contains exit opening 12 being 1.5 mm high by 10 mm wide. Bottom surface 15 has a plane that follows the bottom breakline geometry of the front, side, and back planes. Bottom surface 15 has an angle 17.65 degrees to the horizontal such that a high pressure area exists on the outside surface for the case of forward air flow. Towards the rear of bottom surface 15, there is an exit opening 14 15 mm long by 10 mm wide. Opening 6, whose shape is generally a half-circle with radius 8 mm, is on the front side of bottom surface 15, creating an auxiliary passage 7 extending upwards, which has a wall thickness of 1.5 mm consisting on the front surface plane, and a wall thickness of 2 mm consisting of the wall thickness internal to body 3. There exists in the wall of auxiliary passage 7 corresponding to the front plane, at the top, venturi 8 having a depression generally shaped as an elliptical-hemisphere 10 mm wide and 5 mm high.

The angle of at least a portion of the bottom surface 15 may be between 7 degrees and 35 degrees such that there is significant high pressure on said surface and a portion of air flow is diverted at an angle to the main flow such that separation of the contaminants from the air within the sample will occur. The material can be plastic, however any material (i.e., glass, metal, ceramic, wood) that will maintain the geometrical integrity in the conditions of intended use of the device is considerable.

It is recognized that those skilled in the art of such housings will be aware of variations of the angle of the bottom surface and of the axis of flow within the auxiliary passage, the size and location of the venturi, the location of exit openings, and other parameters of the housing device such that there will be improvements in the cleanliness of the air passing over the sensing elements while at the same time maintaining the housing's resistance to backflow in the condition for flow in the reverse direction. Those and other such variations are considered to come within the scope of the appended claims.

What is claimed:

1. A mass air flow sensor housing structure for a sensing element of a mass air flow sensor positioned in a main air flow for providing controlled air flow to the sensing element using a diversion means including:

a front surface being generally perpendicular to the main air flow;

a bottom inclined surface facing towards said main air flow having a perpendicular component to the main air flow; and an auxiliary passage way that diverts a portion of the main air flow from the bottom surface to pass over the sensing element, which is shielded from the main air flow, in a manner such that any contaminants in the air flow separate from the diverted air at the point of diversion and continue downstream in the main air flow.

2. A mass air flow sensor housing structure for a sensing element of a mass air flow sensor for providing controlled air flow to the sensing element including:

a perpendicular diversion means at an upstream side of said air flow sensor for providing substantially contaminant free air flow over the sensing element for a condition of forward air flow; and a shielding means for substantially eliminating air flow over the sensing element for a condition of reverse air flow.

3. A mass air flow sensor housing structure as recited in claim 2 wherein said diversion means includes:

a bottom surface portion of the housing structure, angled with respect to the direction of main air flow containing an opening for an auxiliary air flow passage way, the angle of the bottom surface being such that there is an adjacent region of relatively high pressure during forward air flow for facilitating air flow into the auxiliary passage and there is an adjacent region of relatively low pressure during reverse air flow for facilitating air flow out of the housing structure; and a venturi located at end of the auxiliary passage way to redirect air over sensing elements.

4. A mass air flow sensor housing structure as recited in claim 3 wherein said shielding means includes:

a back orifice for receiving reverse air flow into the housing structure;

a blocking body positioned between the sensing element and the back orifice so that the sensing element is shielded from a direct reverse air flow within the housing structure; and a bleed orifice on the bottom surface of the housing structure for bleeding reverse air flow out of the housing structure.

5. A mass air flow sensor housing structure as recited in claim 4 wherein:

said bleed orifice is in communication with said venturi for passing forward air flow out of the housing structure; and said blocking body is spaced from said back orifice so that a reverse air flow path is provided between said back orifice and said bleed orifice.

6. A mass air flow sensor housing structure as recited in claim 5 wherein the angle of the bottom surface, with respect to the direction of main air flow, is between about 7 degrees and about 35 degrees.

7. A method of providing an air sample from a main air flow to a mass air flow sensor having a sensing element in a housing structure, including reducing contamination in the air flow by the steps of:

diverting a portion of the main air flow such that contaminants are substantially retained only in the main air flow stream and substantially eliminated from the diverted portion of main air flow;

directing the diverted air through an auxiliary passage within the housing structure;

directing the air within the auxiliary passage through a venturi, and over the sensing element;

locating the sensing element within the housing structure such that the sensing element subjected to only the diverted air during a condition of forward air flow; and providing openings within the rear of the housing structure, such that the diverted air passes over the sensing elements and exits the housing structure.

8. A method of providing an air sample as recited in claim 7 including a method of eliminating the effect of back air flow on the sensing element wherein the step of providing openings within the rear of the housing structure includes the steps of:

locating a back orifice in the housing structure so that air flow in the reverse direction enters the housing structure;

locating a bleed orifice providing an air flow exit from the housing structure, the direction of exiting air flow being substantially in a direction perpendicular to the main air flow; and locating a blocking wall in the housing structure for blocking direct reverse air flow from the back orifice to the sensing element and for defining an air flow passage from the back orifice to the bleed orifice for providing a reverse air flow path out of the housing structure.

9. A method of providing an air sample as recited in claim 8 further comprising the steps of:

providing a bottom surface to the housing structure with a surface angled with respect to the direction of main air flow so that the bottom surface has a region of relatively high air pressure during forward air flow for facilitating air flow into the auxiliary passage and the bottom surface has a region of relatively low air pressure during reverse air flow for facilitating air flow out of the housing structure through the bleed orifice.

10. A method of providing an air sample as recited in claim 9 further comprising the step of providing a forward air flow path from the auxiliary passage to the back orifice.

* * * * *